US008280023B2

(12) United States Patent
Ishibashi et al.

(10) Patent No.: US 8,280,023 B2
(45) Date of Patent: Oct. 2, 2012

(54) COMMUNICATION CONFERENCE SYSTEM, VOICE CHANGING DEVICE, AND SIGNAL CONVERTING ADAPTOR

(75) Inventors: Toshiaki Ishibashi, Fukuroi (JP); Katsuichi Osakabe, Hamamatsu (JP)

(73) Assignee: Yamaha Corporation (JP)

( * ) Notice: Subject to any disclaimer, the term of this patent is extended or adjusted under 35 U.S.C. 154(b) by 999 days.

(21) Appl. No.: 12/278,969

(22) PCT Filed: Feb. 6, 2007

(86) PCT No.: PCT/JP2007/052043
§ 371 (c)(1),
(2), (4) Date: Aug. 9, 2008

(87) PCT Pub. No.: WO2007/091565
PCT Pub. Date: Aug. 16, 2007

(65) Prior Publication Data
US 2009/0016515 A1    Jan. 15, 2009

(30) Foreign Application Priority Data
Feb. 9, 2006    (JP) .................................. 2006-032870

(51) Int. Cl.
*H04M 7/00*    (2006.01)
(52) U.S. Cl. .................... 379/202.01; 370/261; 709/204; 709/227
(58) Field of Classification Search ............. 379/202.01; 370/261; 709/204, 227
See application file for complete search history.

(56) References Cited

U.S. PATENT DOCUMENTS
| | | |
|---|---|---|
| 6,501,740 B1 | 12/2002 | Sun et al. |
| 2003/0026244 A1 | 2/2003 | Pietrowicz et al. |
| 2003/0142662 A1 | 7/2003 | Mahajan |
| 2004/0101116 A1 | 5/2004 | Chida et al. |
| 2004/0240432 A1 | 12/2004 | Ying et al. |
| 2005/0286698 A1* | 12/2005 | Bathurst et al. .......... 379/202.01 |

FOREIGN PATENT DOCUMENTS
JP    7-39159 U    7/1995
(Continued)

OTHER PUBLICATIONS

Search report issued in corresponding application No. PCT/JP2007/052043, mailed May 22, 2007.
Extended European Search Report issued in corresponding European patent application No. 07713872.5 dated Mar. 17, 2011.
JPOA Notification of Reason for Refusal for corresponding JP 2006-032870, dated Oct. 11, 2011.

(Continued)

*Primary Examiner* — Quynh Nguyen
(74) *Attorney, Agent, or Firm* — Rossi, Kimms & McDowell LLP

(57) ABSTRACT

A communication conference system that enables users who have only a connecting unit via a telephone line network and users who have only an IP connecting unit to hold a talk session mutually without a need of an expensive dedicated conference server is provided. A talk session device 1 includes a network processing portion for transmitting/receiving voice information to/from other equipments via IP, and a terminal for inputting/outputting a voice signal. The talk session device 1 is connected to a handset terminal of a telephone 3 via an adaptor 2 that converts the standards (mainly a level) of the voice signal. The talk session device 1 is connected to other talk session devices via IP, and is connected to other telephones by a telephone line via the telephone 3. Accordingly, a user serving as a destination of the IP and a user serving as a destination of the telephone line are connected mutually.

6 Claims, 3 Drawing Sheets

FOREIGN PATENT DOCUMENTS

| | | | |
|---|---|---|---|
| JP | 10-257053 | A | 9/1998 |
| JP | 10-285291 | A | 10/1998 |
| JP | 2004104490 | A | 4/2004 |
| JP | 2005-286972 | A | 10/2005 |
| WO | 02/063840 | A1 | 8/2002 |

OTHER PUBLICATIONS

Office Action issued in corresponding Canadian patent application No. 2641809, dated Nov. 10, 2011.

* cited by examiner

COMMUNICATION CONFERENCE SYSTEM, VOICE CHANGING DEVICE, AND SIGNAL CONVERTING ADAPTOR

This application is a U.S. National Phase Application of PCT International Application PCT/JP2007/052043 filed on Feb. 6, 2007 which is based on and claims priority from JP 2006-032870 filed on Feb. 9, 2006, the contents of which is incorporated herein in its entirety by reference.

TECHNICAL FIELD

The present invention relates to a communication conference system capable of holding a talk session through both an analog telephone line network and an Internet Protocol, despite its simple configuration.

BACKGROUND ART

Recently a communication conference (talk session) unit equipped with a speaker and a microphone becomes widespread. The communication conference unit dials in to the conference server via the telephone line network. When the communication conference units set up at plural points dial in to the conference server respectively, users can have a voice talk with other users.

Meanwhile, recently VoIP (Voice over Internet Protocol) that holds a voice talk on the Internet Protocol (referred to as "IP" hereinafter) is spreading. When the user holds a voice talk on IP, the communication conference unit accesses to an IP address of the IP conference server (referred to as "MCU (Multipoint Control Unit)" hereinafter) and transmits/receives voice information while using Protocols such as TCP (Transmission Control Protocol), SIP (Session Initiation Protocol), and the like.

The telephone line network is diffused conventionally, and VoIP is becoming rapidly common in recent years. Therefore, the user who has only the connecting unit to the conference server via the conventional telephone line network and the user who has only the connecting unit to MCU via IP exist. The user who has only the connecting unit to the conference server via the conventional telephone line network cannot access to MCU via IP, while the user who has only the connecting unit to MCU via IP cannot access to the conference server via the telephone line network.

As a result, the architecture that can link the user who has only the connecting unit to the conference server via the conventional telephone line network and the user who has only the connecting unit to MCU via IP mutually has been proposed (see Patent Literature 1, for example).
Patent Literature 1: WO02063840 (JP-T-2004-527156)

DISCLOSURE OF THE INVENTION

Problems that the Invention is to Solve

According to the architecture in Patent Literature 1, all users can hold a talk session respectively by providing at least two conference servers (i.e., the conference server for the telephone line network and the conference server for the IP) and connecting these servers mutually.

However, according to the architecture in Patent Literature 1, two (plural) dedicated conference servers that can be connected mutually are needed. Therefore, such a problem existed that the provision of plural expensive dedicated conference servers entails high cost.

It is an object of the present invention to provide a communication conference system that enables users who have only a connecting unit via a telephone line network and users who have only an IP connecting unit to hold a talk session mutually without a need of an expensive dedicated conference server.

Means for Solving the Problems

A communication conference system of the present invention includes a telephone line connector connected to a telephone line, a signal converting adaptor and talk session device. The a signal converting adaptor, includes an input/output terminal that inputs/outputs a voice signal into/from the telephone line connector; a signal converting circuit that converts the voice signal output from the input/output terminal into a voice signal adapted to the telephone line connector, and converts the voice signal input from the input/output terminal into a voice signal adapted to an audio equipment; an external voice output terminal that outputs the voice signal input from the input/output terminal via the signal converting circuit to an outside; and an external voice input terminal that supplies the voice signal input from the outside to the input/output terminal via the signal converting circuit. The talk session device includes a network interface connected to a network, and the network interface being transmitting/receiving voice information to/from a communication destination equipment via the network; a voice input terminal that inputs the voice signal from the external voice output terminal; a voice output terminal that outputs the voice signal to the external voice input terminal; a speaker that emits a voice from the input voice signal; a microphone that picks up the voice to output the voice signal; and a processing portion that supplies voice information input from the network interface as the voice signal to the speaker and to the input/output terminal via the signal converting circuit, supplies the voice signal picked up by the microphone to the input/output terminal via the signal converting circuit and to the network interface as voice information, and supplies the voice signal input from the input/output terminal via the signal converting circuit to the speaker and to the network interface as voice information.

In the present invention, the processing portion is constructed by the audio processing portion for splitting/outputting the input voice signal (digital voice signal), and the network processing portion for outputting the voice signal to other equipment as voice information via the network interface (and the Internet). The voice information is transmitted/received as Protocols such as TCP, and the like, for example. The adaptor connected between the telephone and the talk session device converts the voice signal being input from the talk session device into a signal applicable to the telephone (although different every telephone, about 10 mV, for example) and outputs this signal to the telephone, and converts the voice signal being input from the telephone into a signal applicable to the audio equipment (about 1.5 V, for example) and outputs this converted signal to the talk session device.

The voice information being input from the communication destination equipment via the network is emitted from the speaker of the talk session device, and is output to the telephone line connector (telephone) as the voice signal via the adaptor. The analog voice signal being input into the telephone is transmitted to the destination of connection in the telephone line. The analog voice signal being picked up by the microphone of the talk session device is output to the telephone via the adaptor like the above, and is output to the network as the voice information. Also, the analog voice signal being input into the talk session device from the telephone via the adaptor is emitted from the speaker of the talk session device, and is output to the network as the voice information.

In other words, the talk session device is connected to other talk session device (IP telephone), and the like via the IP connection, and is simultaneously connected to the user of the existing telephone line network via the telephone. As a result, the user for the IP connection and the user for the telephone line connection are connected mutually via this talk session device, and they can hold the communication conference mutually.

A voice changing device of the present invention includes an input/output terminal that inputs/outputs a voice signal into/from a telephone line connector connected to a telephone line; a signal converting circuit that converts the voice signal output from the input/output terminal into a voice signal adapted to the telephone line connector and converts the voice signal input into the input/output terminal into a voice signal adapted to an audio equipment; a network interface connected to a network, and the network interface being transmitting/receiving voice information to/from a communication destination equipment via the network; a speaker that emits a voice from the input voice signal; a microphone that picks up the voice to output the voice signal; and a processing portion that supplies voice information input from the network interface as the voice signal to the speaker and to the input/output terminal via the signal converting circuit, supplies the voice signal picked up by the microphone to the input/output terminal via the signal converting circuit and to the network interface as voice information, and supplies the voice signal input from the input/output terminal via the signal converting circuit to the speaker and to the network interface as voice information.

A signal converting adaptor of the present invention includes an input/output terminal that inputs/outputs a voice signal into/from a telephone line connector connected to a telephone line; a signal converting circuit that converts the voice signal output from the input/output terminal into a voice signal adapted to the telephone line connector and converts the voice signal input into the input/output terminal into a voice signal adapted to an audio equipment; an external voice output terminal that outputs the voice signal input from the input/output terminal via the signal converting circuit to an external equipment; and an external voice input terminal that supplies the voice signal input from the external equipment to the input/output terminal via the signal converting circuit.

Advantages of the Invention

According to the present invention, the users who have only the connecting unit via the telephone line network and the users who have only the IP connecting unit can hold the talk session mutually without the expensive dedicated conference server. In other words, the users for the telephone line connection can be connected easily to the IP communication conference system that has already been built up, and also the users for the IP connection can be connected easily to the existing communication conference system that is connected to the telephone line.

Figure 1:
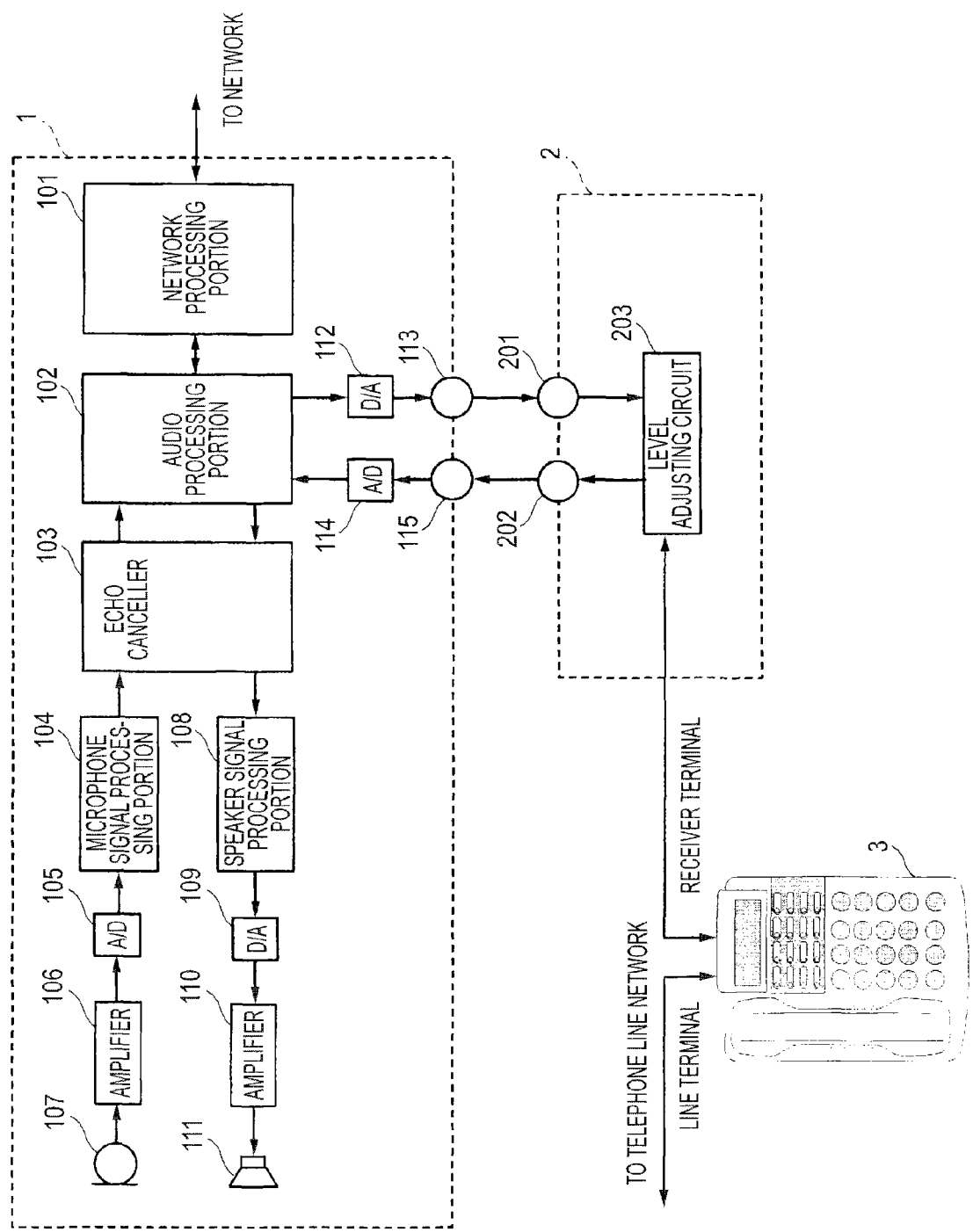
FIG. 1 is a block diagram showing a configuration of a communication conference system.

DESCRIPTION OF REFERENCE NUMERALS 1 talk session device
2 adaptor
3 telephone

BEST MODE FOR CARRYING OUT THE INVENTION

A communication conference system according to an embodiment of the present invention will be explained with reference to the drawings hereinafter. FIG. 1 is a block diagram showing a configuration of a communication conference system. As shown in FIG. 1, this communication conference system is equipped with a talk session device 1, an adaptor 2, and a telephone 3. The talk session device 1 is connected to the adaptor 2, and the adaptor 2 is connected to the telephone 3.

The talk session device 1 has a network processing portion 101, an audio processing portion 102, an echo canceller 103, a microphone signal processing portion 104, an A/D converter 105, an amplifier 106, a microphone 107, a speaker signal processing portion 108, a D/A converter 109, an amplifier 110, a speaker 111, a D/A converter 112, a voice output terminal 113, an A/D converter 114, and a voice input terminal 115.

The output side of the microphone 107 is connected to the amplifier 106, and an analog voice signal picked up by the microphone 107 is amplified by the amplifier 106. The analog voice signal amplified by the amplifier 106 is converted into a digital voice signal by the A/D converter 105 connected to the amplifier 106. The converted digital voice signal is subject to the adjustment of a sound quality (equalizing, or the like) by the microphone signal processing portion 104, and is input into the echo canceller 103.

Figure 2:
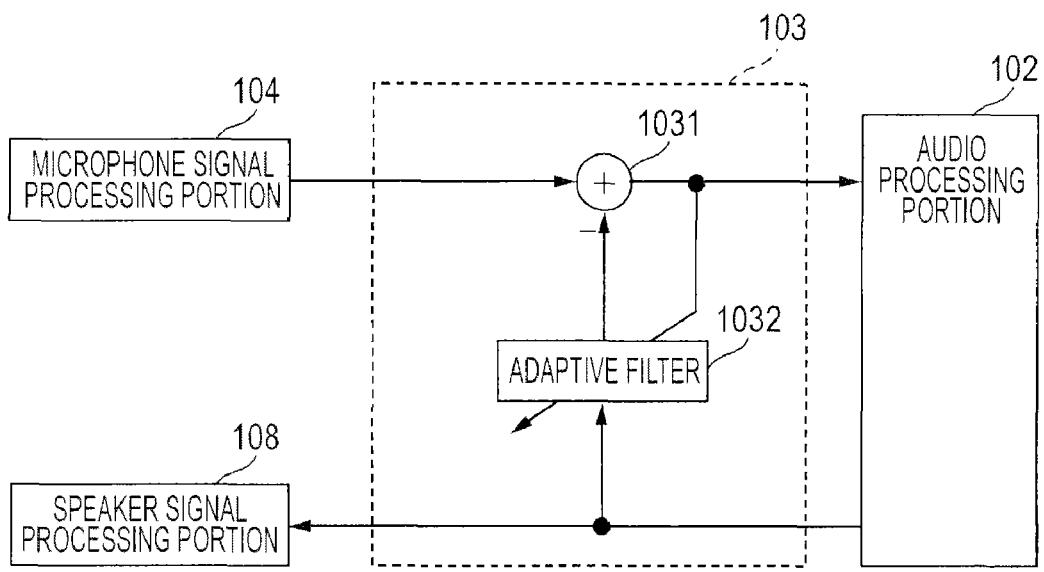
FIG. 2 is a block diagram showing a detailed configuration of an echo canceller.

The echo canceller 103 eliminates echo components from the input digital voice signal. A detailed block diagram of the echo canceller 103 is shown in FIG. 2. The echo canceller 103 has an adder 1031 and an adaptive filter 1032. The adaptive filter 1032 contains a digital filter such as an FIR filter, or the like. The adaptive filter 1032 estimates a transfer function of an acoustic transmission system (acoustic propagation route from the speaker 111 to the microphone 107) in a provision space of the talk session device 1, and calculates a filter coefficients of the FIR filter to simulate the estimated transfer function. The adaptive filter 1032 generates a simulation signal of a detouring component from the speaker 111 to the microphone 107 by using this calculated filter coefficients. This simulation signal is subtracted from an output signal of the microphone signal processing portion 104 by the adder 1031. Therefore, an output signal of the adder 1031 gives a signal that is obtained by removing the detouring component (echo component) from the picked-up signal of the microphone 107.

The estimation of the transfer function and the calculation of the filter coefficients are executed by using the adaptive algorithm, based on a signal supplied to the speaker 111 while using a residue signal as the signal being output from the adder 1031 as a reference signal. The adaptive algorithm is an algorithm that is used to calculate the filter coefficients such that the residue signal is reduced as small as possible.

Accordingly, a signal that simulates the detouring signal (voice signal fed from the speaker to the microphone 107) of the acoustic transmission system is generated by the adaptive filter 1032. Then, the simulation signal is subtracted from the picked-up signal by the adder 1031, so that only the detouring signal can be attenuated effectively. As a result, the echo canceller 103 can eliminate the echo generated by detouring signal.

In FIG. 1, the digital voice signal from which the echo component is eliminated by the echo canceller 103 is input into the audio processing portion 102. The digital voice signal being input into the audio processing portion 102 is input into the network processing portion 101 and the D/A converter 112. The network processing portion 101 outputs the input digital voice signal as voice information to other talk session device (IP phone) via the network (Internet) according to the predetermined protocols (TCP, etc.). The network processing portion 101 transmits/receives the voice information to/from other unit via the IP connection.

The digital voice signal being input into the D/A converter 112 is converted into an analog voice signal, and is input into the voice output terminal 113. The voice output terminal 113 is a general-purpose analog voice output terminal (e.g., pin jack), and outputs the voice signal to other equipment via a cable connected to this terminal. In the present embodiment, the voice output terminal 113 is connected to a voice input terminal 201 of the adaptor 2, and supplies the voice signal to the adaptor 2. Of course, this voice output terminal 113 may be connected to other audio equipment, or the like.

The network processing portion 101 converts the voice information of the predetermined protocol being input from other equipment via the Internet into the digital voice signal, and inputs this digital voice signal into the audio processing portion 102. The digital voice signal being input into the audio processing portion 102 is input into the echo canceller 103 and the D/A converter 112. The digital voice signal being input into the D/A converter 112 is output from the voice output terminal 113 to other equipment as the analog voice signal, as described above.

As shown in FIG. 2, the digital voice signal being input into the echo canceller 103 is input into the adaptive filter 1032 as an estimated component of the echo, and also is input into the speaker signal processing portion 108. The digital voice signal being input into the speaker signal processing portion 108 is subject to the adjustment of sound quality (equalizing, or the like), and then is input into the D/A converter 109 and is converted into the analog voice signal. The analog voice signal converted by the D/A converter 109 is amplified by the amplifier 110, and then is emitted from the speaker 111.

The voice input terminal 115 is a general-purpose analog voice input terminal (e.g., pin jack), and inputs the voice signal being input from other equipment into the A/D converter 114 via a cable connected to this terminal. In the present embodiment, the voice input terminal 115 is connected to a voice output terminal 202 of the adaptor 2, and receives the voice signal from the adaptor 2. Of course, the voice input terminal 115 may be connected to other audio equipment, or the like. The analog voice signal being input from the voice input terminal 115 to the A/D converter 114 is converted into the digital voice signal, and is input into the audio processing portion 102. The digital voice signal being input into the audio processing portion 102 is input into the network processing portion 101 and the echo canceller 103. The digital voice signal being input into the network processing portion 101 is output to other equipment as the voice information via the Internet. The digital voice signal being input into the echo canceller 103 is subject to the adjustment of sound quality, or the like, and is emitted from the speaker 111, as described above.

As described above, the talk session device 1 emits the voice from its own speaker 111 and outputs the voice signal from the voice output terminal 113, based on the voice information being input from other equipment via the Internet. Also, the talk session device 1 emits the voice from its own speaker 111 and outputs the voice information to other equipment via the Internet, based on the voice signal being input from the voice input terminal 115. In addition, the talk session device 1 outputs the voice signal from the voice output terminal 113 and outputs the voice information to other equipment via the Internet, based on the voice signal picked up by its own microphone 107.

Here, the audio processing portion 102 splits three digital voice signals being input as described above, and thus generates six output signals once. In this case, a built-in adder (not shown) adds the input digital voice signals in two systems and outputs a single digital voice signal, and as a result three digital voice signals are output.

In other words, the digital voice signal being output to the network processing portion 101 is generated by adding the signal being input from the echo canceller 103 and the signal being input from the A/D converter 114. The digital voice signal being output to the D/A converter 112 is generated by adding the signal being input from the echo canceller 103 and the signal being input from the network processing portion 101. Similarly, the digital voice signal being output to the echo canceller 103 is generated by adding the signal being input from the A/D converter 114 and the signal being input from the network processing portion 101.

Here, in the talk session device 1, an example in which the echo canceller is used as a suppressing unit for suppressing the detouring signal of the acoustic transmission system is illustrated. But the present embodiment is not limited to this mode. For example, a voice switch shown in FIG. 3 may be employed.

Figure 3:
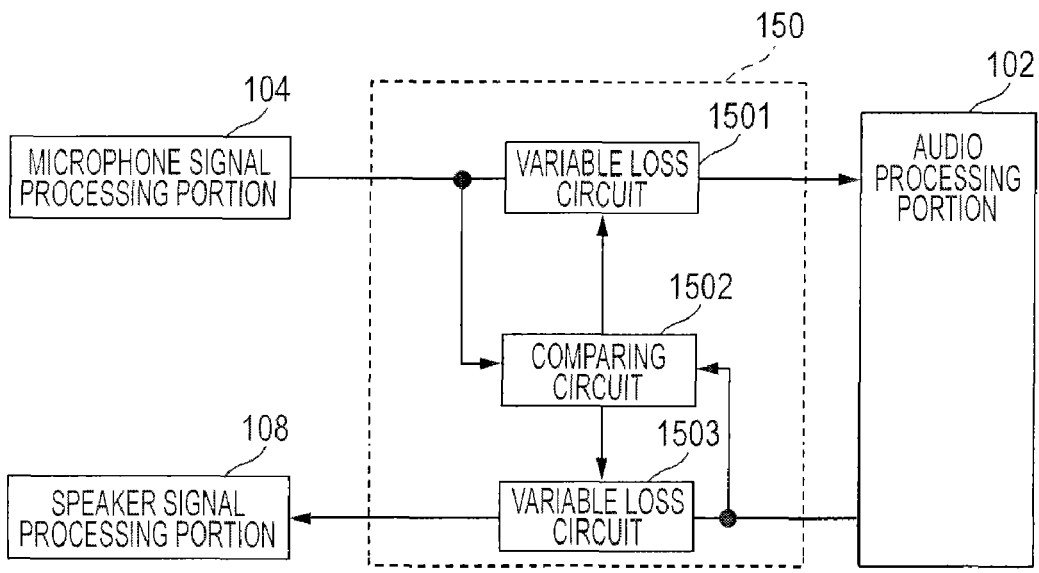
FIG. 3 is a block diagram showing a detailed configuration of a voice switch.

FIG. 3 is a block diagram showing a detailed configuration of a voice switch 150.

In FIG. 3, the voice switch 150 replaces the echo canceller 103 in FIG. 1, and contains an output-side variable loss circuit 1501, a comparing circuit 1502, and an input-side variable loss circuit 1503. The comparing circuit 1502 compares the digital voice signal being output from the microphone signal processing portion 104 and the digital voice signal being output from the audio processing portion 102. When the comparing circuit 1502 detects that a level of the digital voice signal being output from the audio processing portion 102 is higher than a level of the digital voice signal being output from the microphone signal processing portion 104, it decides that the user of the talk session device 1 is mainly receiving the talk and then applies level-reduction control to the output-side variable loss circuit 1501. The output-side variable loss circuit 1501 reduces a level of the digital voice signal being output from the microphone signal processing portion 104 in compliance with this level-reduction control, and outputs the reduced digital voice signal to the audio processing portion 102.

Meanwhile, when the comparing circuit 1502 detects that a level of the digital voice signal being output from the microphone signal processing portion 104 is higher than a level of the digital voice signal being output from the audio processing portion 102, it decides that the user of the talk session device 1 is mainly transmitting the talk and then applies level-reduction control to the input-side variable loss circuit

1503. The input-side variable loss circuit 1503 reduces a level of the digital voice signal being output from the audio processing portion 102 in compliance with this level-reduction control, and outputs the reduced digital voice signal to the microphone signal processing portion 104. As described above, the voice from the outside is suppressed during transmission of talk and the picked-up sound is suppressed during reception of talk, and as a result the detouring signal can be suppressed.

The adaptor 2 has the voice input terminal 201, the voice output terminal 202, and a level adjusting circuit 203. The voice input terminal 201 is a general-purpose analog voice input terminal (e.g., pin jack), and inputs the voice signal being input from other equipment to the level adjusting circuit 203 via a cable connected to this terminal. In the present embodiment, the voice input terminal 201 is connected to the voice output terminal 113 of the talk session device 1. Of course, this voice input terminal 201 may be connected to other audio equipment, or the like.

The voice output terminal 202 is a general-purpose analog voice output terminal (e.g., pin jack), and outputs the voice signal being input from the level adjusting circuit 203 to other equipment via a cable connected to this terminal. In the present embodiment, the voice output terminal 202 is connected to the voice input terminal 115 of the talk session device 1. Of course, this voice output terminal 202 may be connected to other audio equipment, or the like.

The level adjusting circuit 203 is connected to the voice input terminal 201 and the voice output terminal 202, and is connected to the telephone 3. This level adjusting circuit 203 is connected to the telephone 3 via a general-purpose voice signal cable (e.g., four-pole/four-conductor receiver modular cable). That is, the adaptor 2 has the terminal to which the receiver modular cable is connected (the input/output terminals in the present invention). Also, the level adjusting circuit 203 converts the voice signal being input from the voice input terminal 201 into a signal applicable to the telephone main body, and then outputs the converted signal to the telephone 3. Although the applicable signal is different depending on the telephone, the signal may be converted to a signal of almost several tens mV, for example. In this case, a voltage adjusting switch, or the like may be provided to the adaptor 2, and the user may change a level of the output signal of the level adjusting circuit 203 by using the switch. Also, the level adjusting circuit 203 converts the signal being input from the telephone 3 into a signal applicable to the audio equipment (e.g., signal of about 1.5 V), and then outputs the converted signal to the voice output terminal 202.

The telephone 3 is a usual telephone, and has a LINE terminal connected to the telephone line network, a receiver terminal connected to the handset, and the like. The telephone 3 is connected to the adaptor 2 via the receiver terminal and the receiver modular cable. In the present embodiment, the handset of the telephone 3 is set (on-hook) on the main body of the telephone 3 in a state that the receiver modular cable is removed. The user can connect the telephone 3 to other telephone by picking up the handset and then dialing the predetermined phone number in the off-hook state.

In this event, a change switch may be provided between the adaptor 2 and the telephone 3, then the handset of the telephone may be connected to this change switch, and then the equipment that transmits/receives the signal to/from the telephone 3 may be switched by using the handset and the adaptor. The user can use the telephone 3 as the usual telephone when the change switch is switched to transmit/receive the signal via the telephone 3 and the handset, and also can use the telephone 3 as the talk session device 1 of the present invention when the change switch is switched to transmit/receive the signal via the telephone 3 and the adaptor 2.

Figure 4:
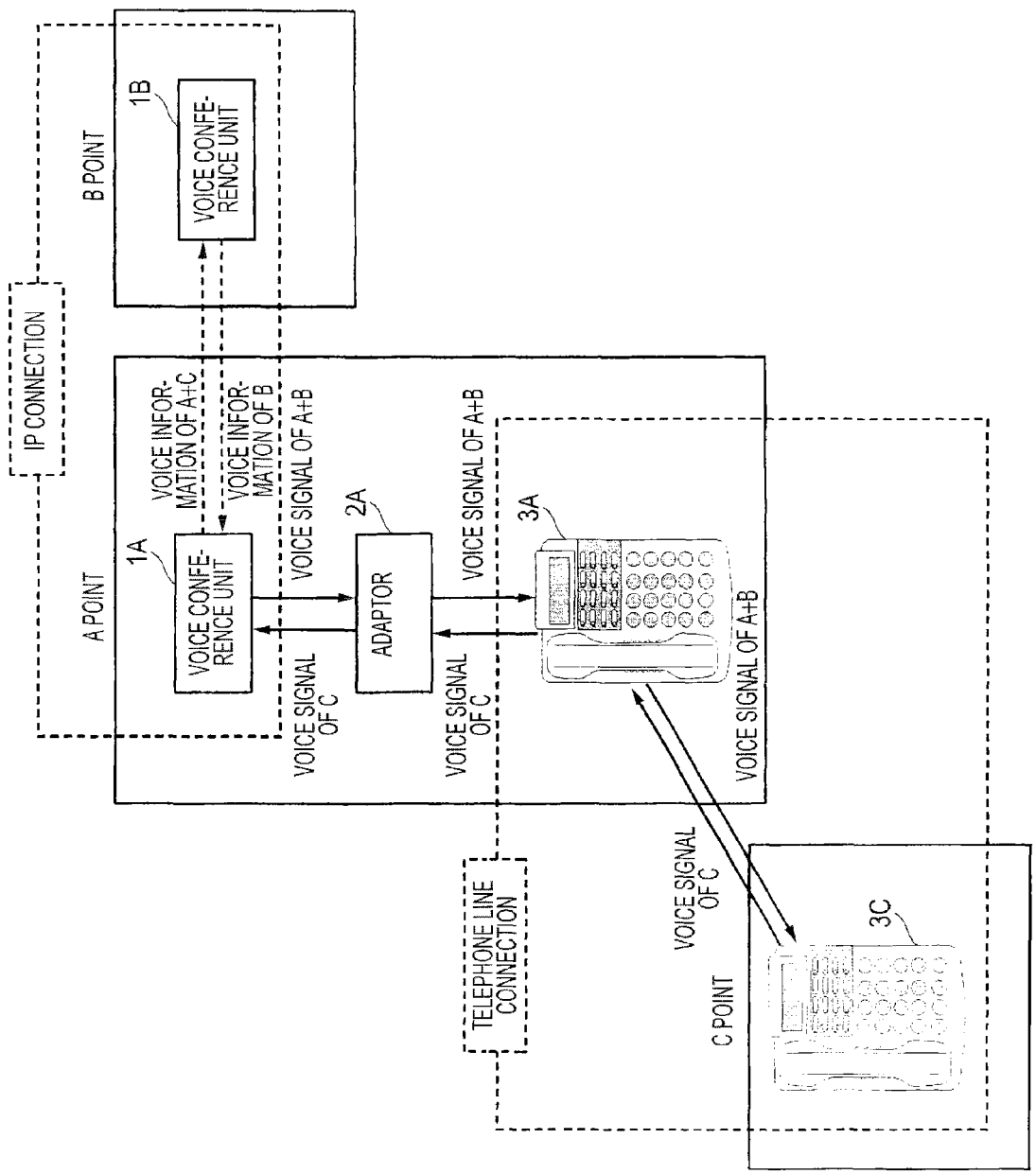
FIG. 4 is a view explaining a flow of a voice signal (voice information) of a communication conference system.

Next, FIG. 4 is a view explaining a flow of the voice signal (voice information) of the communication conference system in the present embodiment. In FIG. 4, an example in which the communication conference is held among three points, i.e., A point, B point, C point, will be explained hereunder. The communication conference system shown in FIG. 1 is built up at the A point. In FIG. 4, the communication conference system 1 at the A point is called a talk session device 1A, the adaptor 2 at the A point is called an adaptor 2A, and the telephone 3 at the A point is called a telephone 3A. Also, the communication conference system 1 at the B point is called a talk session device 1B, and the telephone 3 at the C point is called a telephone 3C.

The talk session device 1A is connected to the talk session device 1B via the Internet (via IP). The telephone 3A is connected to the telephone 3C via the telephone line network. The user at the A point connects the talk session device 1A to the talk session device 1B at the B point by designating its IP address. Also, the user at the A point connects the telephone 3A to the telephone 3C at the C point by dialing its telephone number.

In this condition, when the user at the A point inputs the voice into the microphone of the talk session device 1A, this analog voice signal is transmitted to the telephone 3C at the C point via the adaptor 2A and the telephone 3A, and also is transmitted to the talk session device 1B at the B point as voice information. The analog voice signal picked up at the A point is emitted from the speaker of the talk session device 1B at the B point, and also is emitted from the handset of the telephone 3C at the C point.

When the user at the B point inputs the voice into the microphone of the talk session device 1B, this analog voice signal is transmitted to the talk session device 1A as voice information and also is transmitted to the telephone 3C at the C point via the adaptor 2A. The analog voice signal picked up at the B point is emitted from the speaker of the talk session device 1A at the A point, and also is emitted from the handset of the telephone 3C at the C point.

When the user at the C point inputs the voice into the handset of the telephone 3C, this analog voice signal is transmitted to the telephone 3A and also input into the talk session device 1A via the adaptor 2A. The analog voice signal being input into the talk session device 1A is transmitted to the talk session device 1B at the B point as the voice information. Therefore, the voice of the user at the C point is emitted from the speaker of the talk session device 1A, and also is emitted from the speaker of the talk session device 1B at the B point.

The voice information picked up at the A point and the voice information picked up at the C point are transmitted from the A point to the B point via the IP, and the voice signal picked up at the A point and the voice signal picked up at the B point are transmitted from the A point to the C point via the telephone line network. Therefore, the user at the B point can hear both the voice of the user at the A point and the voice of the user at the C point. The user at the C point can hear both the voice of the user at the A point and the voice of the user at the B point. Also, the user at the A point can hear both the voice of the user at the B point and the voice of the user at the C point.

Here, the case where the talk session device 1 shown in FIG. 1 is set up is explained at the B point. The equipment at the B point is not limited to this talk session device 1. Any equipment may set up if such equipment can transmit/receive the voice information via the Internet (e.g., the IP phone).

As described above, the user for the IP connection and the user for the telephone line connection can hold the talk session mutually without necessity of the expensive dedicated conference server. Also, when the talk session device 1 is connected to the IP communication conference system that has already been built up, the user for the existing telephone line connection can access easily this IP communication conference system.

In the above, an example in which the talk session device is connected to the telephone at other point via the telephone is illustrated. But the talk session device may dial in to the conference server. When the talk session device dials in to the conference server, the user can have the talk session with a large number of users for the telephone line connection.

Also, in the present embodiment, an example in which the talk session device is connected to the adaptor via the general-purpose voice output terminal and the general-purpose voice input terminal is explained. But the adaptor may be built in the talk session device. In this case, the talk session device may have the receiver modular cable connection terminal.

This application is based upon Japanese Patent Application (Patent Application No. 2006-032870) filed on Feb. 9, 2006; and the contents of which are incorporated herein by reference.

The invention claimed is:

1. A communication conference system comprising:
a telephone line connector connectable to a telephone line, the telephone line connector having a receiver terminal; and
a signal level converting adaptor including:
an input/output terminal, which inputs/outputs a voice signal into/from the telephone line connector, connectable to the receiver terminal of the telephone line connector;
a signal level converting circuit that converts the level of the voice signal outputting from the input/output terminal to have a voice signal level adapted to the telephone line connector, and converts the level of the voice signal input to the input/output terminal to a voice signal level adapted to an audio equipment;
an external voice output terminal that outputs the voice signal input to the input/output terminal via the signal level converting circuit; and
an external voice input terminal that inputs the voice signal and supplies to the input/output terminal via the signal level converting circuit; and
a talk session device including:
a network interface connectable to a network to transmit/receive voice information to/from a communication destination equipment via the network;
a voice input terminal that inputs the voice signal output from the external voice output terminal;
a voice output terminal that outputs the voice signal to the external voice input terminal;
a speaker that emits a voice from the input voice signal;
a microphone that picks up the voice to output the voice signal; and
a processing portion that:
supplies voice information input to the network interface as the voice signal to the speaker and to the input/output terminal via the signal level converting circuit,
supplies the voice signal picked up by the microphone to the input/output terminal via the signal level converting circuit and to the network interface as voice information, and
supplies the voice signal input to the input/output terminal via the signal level converting circuit to the speaker and to the network interface as voice information.

2. A voice signal level changing device comprising:
an input/output terminal that inputs/outputs a voice signal into/from a receiver terminal of a telephone line connector that is connectable to a telephone line;
a signal level converting circuit that converts the level of the voice signal outputting from the input/output terminal to have a voice signal level adapted to the telephone line connector, and converts the level of the voice signal input to the input/output terminal to a voice signal level adapted to an audio equipment;
a network interface connectable to a network to transmit/receive voice information to/from a communication destination equipment via the network;
a speaker that emits a voice from the input voice signal;
a microphone that picks up the voice to output the voice signal; and
a processing portion that:
supplies voice information input to the network interface as the voice signal to the speaker and to the input/output terminal via the signal level converting circuit,
supplies the voice signal picked up by the microphone to the input/output terminal via the signal level converting circuit and to the network interface as voice information, and
supplies the voice signal input to the input/output terminal via the signal level converting circuit to the speaker and to the network interface as voice information.

3. The communication conference system according to claim 1, wherein the talk session device further includes a change receiver that receives a change of a level converting amount of the signal level converting adaptor.

4. The communication conference system according to claim 1, wherein:
the telephone line connector is connectable to another telephone line connector, and
the talk session device is connectable to the communication destination equipment by IP connection, to connect to the another telephone line connector and the communication destination equipment.

5. The voice signal level changing device according to claim 2, further comprising a change receiver that receives a change of a level converting amount of the signal level converting adaptor.

6. The voice signal level changing device according to claim 2, wherein:
the voice signal level changing device is connectable to another telephone line connector, and
the voice signal level changing device is connectable to the communication destination equipment by IP connection, to connect to the another telephone line connector and the communication destination equipment.

* * * * *